Patented Apr. 18, 1950

2,504,895

UNITED STATES PATENT OFFICE 2,504,895

METHOD FOR PREPARATION OF INTERMEDIATE COMPOUNDS SUITABLE FOR CONVERSION INTO NUCLEAR SUBSTITUTED HETEROCYCLIC COMPOUNDS

Harold R. Snyder and Robert E. Jones, Urbana, Ill., assignors, by mesne assignments, to the United States of America as represented by the Secretary of War No Drawing. Application June 4, 1945, Serial No. 597,586

6 Claims. (Cl. 260—465)

The present invention relates generally to the synthesis of certain nuclear substituted quinoline compounds, and more particularly, to a new and improved method of preparing certain types of intermediates suitable for use in the synthesis of 4-hydroxyquinoline compounds.

As pointed out in the copending application of Price, Roberts and Herbrandson, Serial No. 597,584, filed June 4, 1945, nuclear substituted 4-hydroxyquinoline compounds may be prepared by cyclizing various beta-phenylamino acrylates of the type (I) or their isomeric anils (IA),

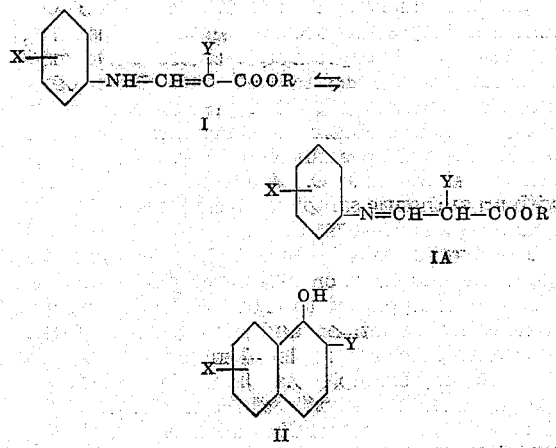

where X is a monovalent nuclear substituent and Y is a carbalkoxy group, a cyano group or a substituted carbamyl group. Cyclization of compounds of this type is accomplished either by fusing the compound itself or by heating a dilute solution of the compound in a high boiling neutral or inert solvent such as diphenyl ether. The process produces high yields of a substituted 4-hydroxyquinoline compound of the type II.

In carrying out the foregoing synthesis, the necessary intermediates (I or IA) of the type where Y is a cyano group have heretofore been prepared by condensing a primary aromatic amine of the type III with an alkoxymethylene cyanacetic ester (IV).

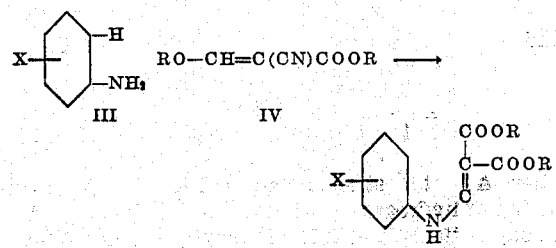

While this method of preparing such starting materials is perhaps satisfactory from the viewpoint of yield, it is nevertheless subject to the disadvantage that alkoxymethylenecyanacetic esters (IV) are difficult and expensive to synthesize.

Broadly stated the object of the present invention is to provide a new and improved method of synthesizing compounds of the type (V)

Ar—NH—CH=C(CN)—COOR

V or their isomeric anils (VI)

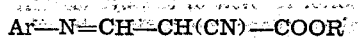

Ar—N=CH—CH(CN)—COOR

VI where Ar is an aryl radical (including a substituted or unsubstituted aryl group) and R is an alkyl group.

A more particular object is the provision of an improved method of synthesizing intermediates of the type (VII)

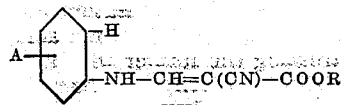

VII or their isomeric anils (VIII)

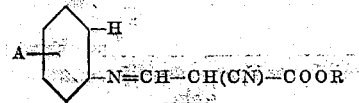

VIII where A is either hydrogen or one or more nuclear substitutents, including, inter alia, halogen, alkyl, haloalkyl, alkoxy, radicals and the like; and R is an alkyl group.

A further object is to synthesize compounds of the type VII or VIII in high yields by a process involving essentially a single step, starting with readily available raw materials.

Still another object is the provision of a new and improved method of synthesizing compounds of the type II by a process involving a minimum number of steps, starting from readily available raw materials.

Other objects and advantages of the present invention will become apparent as the description progresses.

We have found that the foregoing objects may be attained by the process of the present invention which is based upon the discovery that compounds of the type V or VI may be prepared essentially in one step by appropriate treatment of a reaction mixture containing approximately equimolar proportions of (a) a primary aromatic monoamine, (b) an orthoformic ester and (c) a cyanacetic ester. At a temperature of the order of about 130° C. to about 170° C., this three-component reaction mixture produces directly, a compound of type V or VI, three moles of alcohol being split out in the course of the reaction. The overall reaction may therefore be represented by the following scheme:

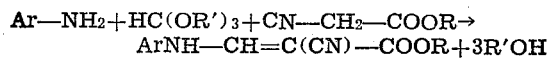
Ar—NH₂+HC(OR')₃+CN—CH₂—COOR→
ArNH—CH=C(CN)—COOR+3R'OH

In carrying out the process of the present invention, the three-component reaction mixture is preferably heated under conditions permitting the distillation of the alcohol formed in the reaction, thereby continuously removing one reaction product as it is formed. The temperature of the reaction mixture is maintained within the range indicated until approximately the theoretical amount (3 moles) of alcohol has been collected. The reaction mixture may then be cooled and the solid which usually separates may be removed by suitable means such as filtration.

The solid product thus obtained consists of a compound of type V or VI. This compound may be cyclized if desired by heating a dilute solution thereof in a high boiling inert or neutral solvent, for example mineral oil or diphenyl ether. This operation is also preferably carried out under conditions permitting the distillation of the alcohol formed in the cyclization reaction which takes place according to the overall scheme:

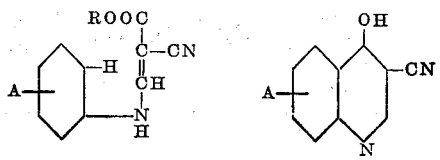

The nitrile formed by cyclization may be hydrolyzed to the corresponding free acid, for example, by treating the former with aqueous sulfuric acid of 60–70% strength. The resulting free acid may be decarboxylated merely by fusion or by heating a solution of the acid in a high boiling neutral solvent, to a temperature of the order of the melting point of the acid.

In order more clearly to disclose the nature of the present invention a specific example will be described in considerable detail. It should be clearly understood however that this is done solely by way of example and not for the purpose of delineating the scope of the invention or of restricting the ambit of the appended claims.

EXAMPLE

1. Direct synthesis of ethyl-α-cyano-β-(m-chloranilino)acrylate

Eleven and three-tenths grams (0.1 mole) of cyanacetic ester, 14.8 g. (0.1 mole) of ethyl orthoformate and 12.8 g. (0.1 mole) of m-chloraniline were mixed in a small flask and heated on a hot plate at 150° C. for one and one-quarter hours. During this time the calculated amount of ethyl alcohol (17 cc.) was collected and heating was stopped. The product crystallized as a bright yellow solid immediately upon cooling. The yield was quantitative; M. P. 120–125° C. A mixed melting point with the product obtained by reaction of m-chloroaniline upon ethoxymethylenecyanacetic ester showed no depression. Recrystallization of 14.1 g. of crude product from an excess of absolute alcohol gave 11.2 g. of pure white needles melting at 126–128° C.

2. Cyclization

A 70% yield of cyclized product was obtained by refluxing for five hours a solution of about 0.1 mole of the product obtained in step 1 dissolved in 700 cc of diphenyl ether. The cyclized product crystallized from the diphenyl ether in tan flakes, melting point ca. 360–370° C. The product consisted of 7-chloro-3-cyano-4-hydroxyquinoline.

3. Hydrolysis 13.6 g. of the cyclized product obtained in step 2 was refluxed with 200 g. of 60% sulfuric acid for one hour. The solution was then cooled and the tan crystals which separated therefrom were removed by filtration through a sintered glass funnel. The solid was dissolved in dilute alkali, treated with charcoal, the solution filtered and then treated with acid to reprecipitate the acid as a white product melting at 270–272° C. (with decarboxylation); yield, 12.7 g. The filtrate from which the acid had been separated was made alkaline, then treated with charcoal and again neutralized with acid; 1.7 g. of a solid melting at below 240° C. (with decarboxylation) was obtained.

4. Decarboxylation

The acid melting at 270–272° C. (dec.) obtained in step 3 was decarboxylated by fusion at 275–285° C. The product, 7-chloro-4-hydroxyquinoline, was recrystallized once from ethyl alcohol in water; 4 g. of a product melting at 274–280° C. was obtained. Concentration of the filtrate yielded an additional 3.3 g. of a product melting at 276–280° C. A mixed melting point with an authentic sample of 7-chloro-4-hydroxyquinoline was 276–279° C.

The overall yield of pure 7-chloro-4-hydroxyquinoline was 7.3 g. or 70% based on the nitrile.

It will be apparent to those skilled in the art that many variations and modification of the procedure described in detail in connection with the foregoing example, may be made without departing from the spirit and scope of the invention. It will further be apparent that the principles involved may be applied to a wide variety of related compounds. All such variations, modifications and extensions are to be understood as included within the scope of the appended claims.

Having thus described our invention, what we claim as new and wish to secure by Letters Patent is:

1. In the preparation of a compound belonging to the group consisting of the acrylates and their tautomeric anils characterized by the respective type formulae:

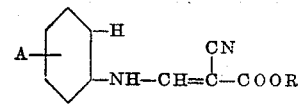

and

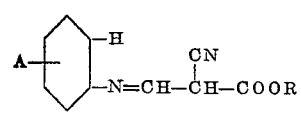

where A is at least one member of the group consisting of hydrogen, alkyl, haloalkyl, halogen, and alkoxy radicals, and R is a lower alkyl radical, the improvement which comprises heating a reaction mixture containing about equimolar proportions of a primary aromatic monoamine of the type

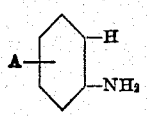

an orthoformic ester of the type HC(OR)₃ and a cyanacetic ester of the type CN—CH₂—COOR; said reaction mixture being heated to a temperature and for a time sufficient to cause the distillation of about 3 molar equivalents of an alcohol therefrom.

2. In the preparation of compounds belonging to the group consisting of the acrylates and their tautomeric anils characterized by the respective type formulae

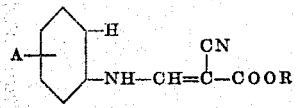

and

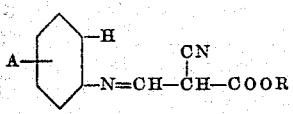

where A is at least one member of the group consisting of hydrogen, alkyl, haloalkyl, halogen and alkoxy radicals and R is a lower alkyl group, the improvement which comprises a reaction mixture containing about equimolar proportions of a primary aromatic monoamine of the type

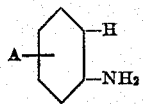

an orthoformic ester of the type HC(OR)₃ and a cyanacetic ester of the type CN—CH₂—COOR, said reaction mixture being maintained at a temperature of the order of about 130° C. to about 170° C. until about 3 molar equivalents of an alcohol ROH have distilled therefrom.

3. The method of claim 2 wherein said primary aromatic amine comprises m-chloraniline.

4. The method of claim 2 wherein said orthoformic ester comprises ethyl orthoformate and said cyanacetic ester comprises the ethyl ester.

5. The method of claim 2 wherein said reaction mixture, after the distillation of said alcohol therefrom, is cooled and the resulting solid reaction product is separated from the reaction mixture.

6. In the preparation of substituted hydroxyquinolines from compounds consisting of the acrylates and their tautomeric anils characterized by the respective type formulae

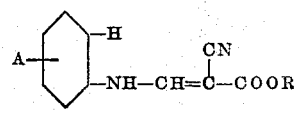

and

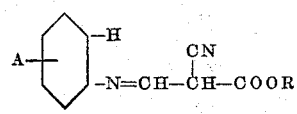

where A is at least one member of the group consisting of hydrogen, halogen, alkyl, haloalkyl and alkoxy radicals, and R is a lower alkyl group, the improvement which comprises providing a reaction mixture containing about equimolar proportions of a primary aromatic monoamine of the type

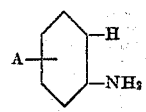

a lower alkyl orthoformic ester and a cyanacetic ester of a low molecular weight alcohol; and heating said reaction mixture to a temperature of the order of about 130° C. to about 170° C. until approximately 3 molar equivalents of an alcohol have distilled therefrom.

HAROLD R. SNYDER.
ROBERT E. JONES.

REFERENCES CITED

The following references are of record in the file of this patent:

UNITED STATES PATENTS

| Number | Name | Date |
|---|---|---|
| 2,304,820 | Hanford et al. | Dec. 15, 1942 |
| 2,351,391 | Bergstrom et al. | June 13, 1944 |

FOREIGN PATENTS

| Number | Country | Date |
|---|---|---|
| 33,497 | Germany | Dec. 21, 1885 |
| 42,276 | Germany | Jan. 19, 1888 |

OTHER REFERENCES

Rubtsov: J. Gen. Chem. (U.S.S.R.), vol. 7; pp. 1885–1895 (1937).